US011332627B2

(12) United States Patent
Yuasa et al.

(10) Patent No.: US 11,332,627 B2
(45) Date of Patent: May 17, 2022

(54) FILAMENT RESIN MOLDED ARTICLE

(71) Applicant: KYORAKU CO., LTD., Kyoto (JP)

(72) Inventors: Ryohei Yuasa, Kanagawa (JP); Takashi Nomura, Kanagawa (JP)

(73) Assignee: KYORAKU CO., LTD., Kyoto (JP)

( * ) Notice: Subject to any disclaimer, the term of this patent is extended or adjusted under 35 U.S.C. 154(b) by 17 days.

(21) Appl. No.: 16/480,696

(22) PCT Filed: Jan. 30, 2018

(86) PCT No.: PCT/JP2018/002904
§ 371 (c)(1),
(2) Date: Jul. 25, 2019

(87) PCT Pub. No.: WO2018/143175
PCT Pub. Date: Aug. 9, 2018

(65) Prior Publication Data
US 2019/0390071 A1    Dec. 26, 2019

(30) Foreign Application Priority Data
Jan. 31, 2017    (JP) .............................. JP2017-015121

(51) Int. Cl.
| C09D 11/037 | (2014.01) |
| B33Y 70/00 | (2020.01) |
| B29B 11/10 | (2006.01) |
| B29B 11/16 | (2006.01) |
| C09D 11/102 | (2014.01) |
| B29C 70/06 | (2006.01) |
| B29C 64/118 | (2017.01) |
| B29K 75/00 | (2006.01) |
| B29K 309/08 | (2006.01) |

(52) U.S. Cl.
CPC ............ *C09D 11/037* (2013.01); *B29B 11/10* (2013.01); *B29B 11/16* (2013.01); *B29C 70/06* (2013.01); *B33Y 70/00* (2014.12); *C09D 11/102* (2013.01); *B29C 64/118* (2017.08); *B29K 2075/00* (2013.01); *B29K 2309/08* (2013.01)

(58) Field of Classification Search
CPC ....... B29B 11/10; B29B 11/16; B29C 64/118; B29C 70/06; B29K 2075/00; B29K 2309/08; B33Y 70/00; C09D 11/037; C09D 11/102
See application file for complete search history.

(56) References Cited

U.S. PATENT DOCUMENTS

| 5,895,718 A | 4/1999 | Ishimura |
| 2001/0030383 A1 | 10/2001 | Swanson |
| 2005/0004282 A1 | 1/2005 | Priedeman |
| 2007/0003656 A1 | 1/2007 | LaBossiere |
| 2009/0295032 A1 | 12/2009 | Hopkins |
| 2013/0077148 A1 | 3/2013 | Ribi |
| 2016/0012935 A1 | 1/2016 | Rothfuss |
| 2016/0289491 A1* | 10/2016 | Li ..................... C08G 59/686 |
| 2017/0360534 A1* | 12/2017 | Sun ..................... C08G 18/10 |
| 2018/0038015 A1 | 2/2018 | Sano |
| 2018/0093413 A1 | 4/2018 | Yuasa |

FOREIGN PATENT DOCUMENTS

| EP | 0368274 A2 | 5/1990 |
| JP | H02225518 A | 9/1990 |
| JP | H10140021 A | 5/1998 |
| JP | 4107960 B2 | 6/2008 |
| JP | 2009500194 A | 1/2009 |
| JP | 2010521339 A | 6/2010 |
| JP | 5039549 B2 | 10/2012 |
| JP | 2016193601 A | 11/2016 |
| JP | 2016203633 A | 12/2016 |

OTHER PUBLICATIONS

International Search Report dated Mar. 13, 2018 filed in PCT/JP2018/002904.
Y. Yang et al. "3D printing of shape memory polymer for functional part fabrication", The International Journal of Advanced Manufacturing Technology, Sep. 24, 2015, p. 2079-2080, vol. 84, Springer-Verlag, London, England; Cited in ISR; Abstract and English text.
Extended European Search Report dated Dec. 21, 2020, in corresponding European application No. 18748154.4; 7 pages.

* cited by examiner

*Primary Examiner* — Patrick D Niland
(74) *Attorney, Agent, or Firm* — Maier & Maier, PLLC

(57) ABSTRACT

Provided is a filament resin molded article capable of reliably maintaining a shape of a 3D model when a shape memory resin is three-dimensionally formed. With the filament resin molded article, it is possible to form 3D models of various shapes, and to improve a curing speed. The filament resin molded article contains a shape memory resin and an inorganic filler. The inorganic filler is, for example, a glass fiber or a carbon fiber. The filament resin molded article is used for a hot melt lamination type 3D printer. A deformed shape is fixed by deforming a 3D shaped object formed using the filament resin molded article containing the shape memory resin, at a temperature which is equal to or higher than a glass transition temperature (Tg) of the shape memory resin and lower than a melting temperature or a decomposition temperature, and cooling the 3D shaped object to the glass transition temperature or lower while maintaining its shape. An original molded shape is recovered by heating the 3D-shaped object in the temperature which is equal to or higher than a glass transition temperature, and lower than a melting temperature or a decomposition temperature.

1 Claim, 4 Drawing Sheets

FILAMENT RESIN MOLDED ARTICLE

TECHNICAL FIELD

The present invention relates to a filament resin molded article. The present invention specifically relates to the filament resin molded article used as a raw material in a modeling apparatus or the like such as a so-called 3D printer for constructing a three-dimensional object.

BACKGROUND ART

The so-called 3D printer is attracting attention as a method for forming a three-dimensional object. A complex shaped three-dimensional object, which has been difficult to create so far, can now also be easily created. By using the 3D printer, it is possible to process even a shape, which cannot be achieved by an ordinary method, by depositing an appropriate material such as resin and metal.

Several types of 3D printers are known. Among them, a method (hot melt lamination method) of extruding, laminating, and depositing resin strands (filament resin molded article) is being developed in various fields because of cost advantages and the like (for example, see Patent Literature 1 and Patent Literature 2).

For example, in a deposition modeling system of Patent Literature 1, a filament which is a modeling material is supplied to an extrusion head. The filament is melted in a liquefier mounted on the extrusion head. The molten filament is extruded onto a base through a nozzle. The extrusion head and the base move relatively to form a 3D model. A number of linear and layered materials are deposited to produce the 3D model.

Patent Literature 2 discloses a method for constructing a 3D object. The method includes feeding a modified ABS material to the extrusion head of a layered deposition system by extrusion, melting the fed modified ABS material in the extrusion head under conditions that improve a response time of the extrusion head, and depositing a molten thermoplastic material in a layer-by-layer manner to form the 3D object.

In this type of method, a basic idea is to melt and deposit a resin material, and the resin strand (filament resin molded article) is used as the raw material. Patent Literature 3 and Patent Literature 4 disclose the resin strand used as the raw material, and a method for supplying the resin strand, and the like.

Patent Literature 3 discloses a composition for producing the three-dimensional object. In an extruder for producing a shaped object, the composition is supplied to the extrusion head as a flexible filament. The filament is melted in the liquefier carried by the extrusion head. The liquefier heats the filament to a temperature slightly above a freezing point to bring it into a molten state. The molten material is extruded onto a base through an orifice of the liquefier.

Patent Literature 4 discloses a filament cassette and a filament cassette receiver for supplying the filament in a three-dimensional deposition modeling machine. Patent Literature 4 provides a method for engaging and disengaging the filament in a simple manner in and from the modeling machine. The method can be implemented in a manner that protects the filament from moisture in an environment.

CITATION LIST

Patent Literature

Patent Literature 1: JP-T-2009-500194
Patent Literature 2: JP-T-2010-521339
Patent Literature 3: Japanese Patent No. 5039549
Patent Literature 4: Japanese Patent No. 4107960

SUMMARY OF THE INVENTION

Problems to be Solved by the Invention

In the 3D printer described above, a shape memory resin may be used as the resin material for formation. The shape memory resin is a resin which can use a molded shape and a deformed shape properly with temperature control by heat. The deformed shape is fixed by deforming a molded article of the shape memory resin at a temperature which is equal to or higher than a glass transition temperature (Tg) of the shape memory resin and which is lower than a melting temperature or a decomposition temperature, and cooling the molded article to the glass transition temperature or lower while maintaining its shape. Further, an original molded shape is recovered by heating the molded article to a temperature which is equal to or higher than a glass transition temperature and which is lower than a melting temperature or a decomposition temperature.

However, when such a shape memory resin is used as the filament in the 3D printer, there is a problem that when forming the 3D model, a speed of curing is low and forming is difficult depending on a shape of the model. The glass transition temperature of the shape memory resin is generally low. If the (molten) shape memory resin having a high temperature is deposited before the temperature is sufficiently lowered, it is difficult to maintain the shape, and problems such as collapse of the shape due to weight occur.

The present invention has been proposed in view of such typical circumstances. An object of the present invention is to provide a filament resin molded article as follows. In the filament resin molded article, when the shape memory resin is three-dimensionally formed, the shape can be reliably maintained, so that 3D models of various shapes can be formed, and a curing speed can also be improved.

Solution to the Problems

In order to achieve the above-mentioned object, the filament resin molded article of the present invention contains the shape memory resin and contains an inorganic filler.

By blending the inorganic filler into the shape memory resin, a thermal conductivity is improved and heat dissipation is improved, and the shape does not collapse even if a forming speed is improved. In addition, shrinkage rate is also reduced, and formability is improved.

Effect of the Invention

According to the filament resin molded article of the present invention, the following filament resin molded article can be provided. The filament resin molded article is excellent in heat dissipation, and for example, the shape is reliably maintained when three-dimensionally forming the shape memory resin. Thus, it is possible to form the 3D models of various shapes and to improve the curing speed.

DESCRIPTION OF THE EMBODIMENTS

Hereinafter, an embodiment of a filament resin molded article to which the present invention is applied will be described with reference to the drawings. Prior to the description of the filament resin molded article of the present embodiment, first, a 3D printer in which the filament resin molded article is used will be described.

A basic mechanism of the 3D printer is to create a three-dimensional object, that is, a 3D object, by depositing cross-sectional shapes using 3D data created by a computer as a design drawing. Examples of the methods include an ink jet method in which a liquid resin is cured little by little by irradiating ultraviolet light or the like, a powder fixing method of blowing adhesive to a powder resin, a hot melt lamination method in which a heat molten resin is deposited little by little, and the like. The filament resin molded article according to the present embodiment is used for a hot melt lamination type 3D printer, and is supplied to the 3D printer, for example, in a state of being wound around a reel.

Figure 1:
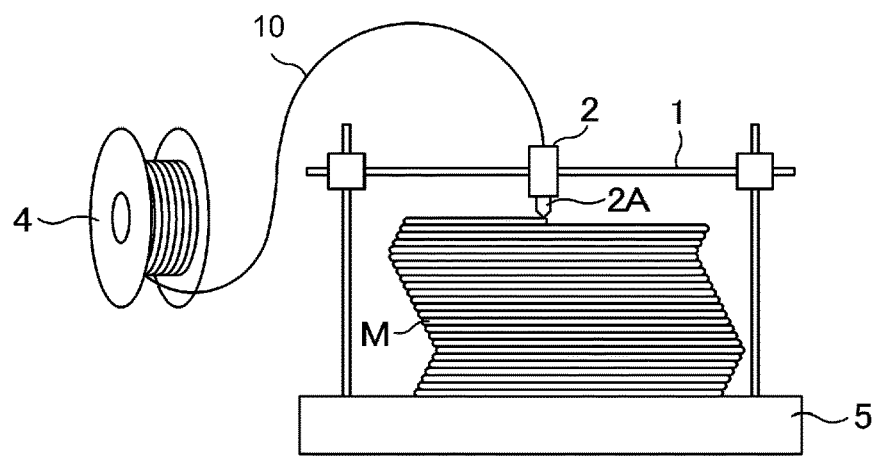
FIG. 1 is a view schematically showing a schematic configuration of a 3D printer.

FIG. 1 is a view showing an example of the 3D printer. The 3D printer of the example includes a shaping head 2 which is three-dimensionally driven by a drive mechanism 1, and a cartridge 4 for supplying a filament resin molded article (filament) 10 made of a resin material to the shaping head 2, as main components. The filament resin molded article 10 wound around the cartridge 4 is introduced to the shaping head 2, heated and melted, and extruded from a nozzle 2A of the shaping head 2. This is deposited and cooled so that a three-dimensional shaped object M is formed on a base 5.

Figure 2:
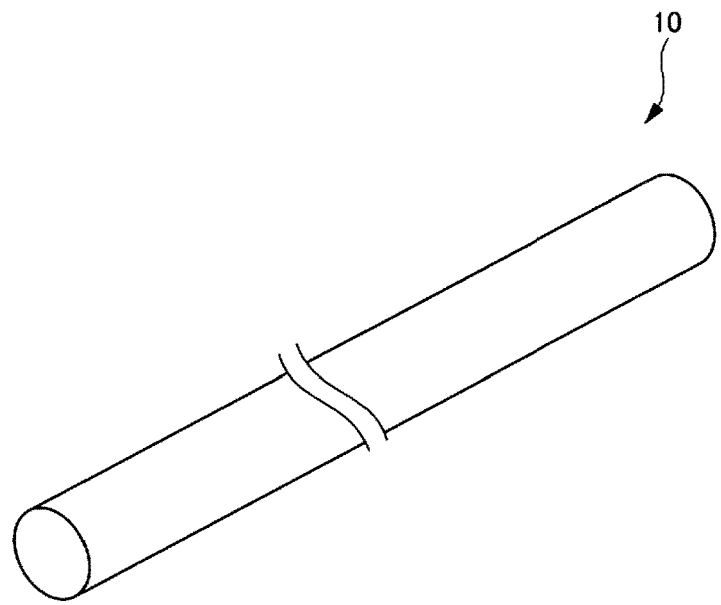
FIG. 2 is a schematic perspective view showing an example of a filament resin molded article.
Figure 3:
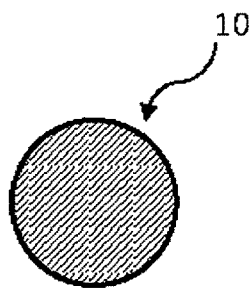
FIG. 3 is a cross-sectional view of the filament resin molded article shown in FIG. 2.

FIGS. 2 and 3 show a so-called single-layered filament resin molded article 10. The single-layered filament resin molded article 10 is obtained by processing a raw material resin into a filament, and has an extremely simple structure. A form of the filament resin molded article is not limited to a single layer form, and may be a multilayer structure of two or more layers.

Constituent materials of the filament resin molded article will be described. The filament resin molded article of the present embodiment is mainly made of a thermoplastic resin. The filament resin molded article of the present embodiment uses a shape memory resin as the thermoplastic resin in order to enable formation of the following 3D model. The 3D model is easily changed in shape by being heated to a glass transition temperature or higher after the formation, and the shape is maintained as it is by being cooled. Further, the 3D model is restored to its original shape by being reheated to the glass transition temperature or higher.

Examples of the shape memory resin may include norbornene-based shape memory polymers, trans-polyisoprene-based shape memory polymers, styrene-butadiene-based shape memory polymers, and urethane-based shape memory polymers. Any of the shape memory polymers can be used.

Blending amount of the shape memory resin in the filament resin molded article is preferably 40% by mass to 89% by mass, and more preferably 60% by mass to 79% by mass, in consideration of formability and the like.

In the filament resin molded article, when the shape memory resin is used alone, the shape easily collapses due to influence of heat at the time of deposition and the like, and a forming speed cannot be increased. Therefore, in the filament resin molded article of the present embodiment, an inorganic filler is blended in order to improve heat dissipation.

As the inorganic filler, a fibrous filler and a powdery filler can be used, and quality of the material is also optional. The inorganic filler is preferably one having a high thermal conductivity. Examples of the inorganic filler may include carbon fiber, glass fiber, talc, nano clay, calcium carbonate, and magnesium carbonate. Preferred are the carbon fiber and the glass fiber each having a good thermal conductivity. Note that when the fibrous inorganic filler is used, there is also an advantage that restoration of the shape after the formation is also high.

An addition amount of the inorganic filler may be set according to required performance (the heat dissipation or the like). The addition amount of the inorganic filler is preferably 3% by mass to 30% by mass, and more preferably 5% by mass to 20% by mass. If the blending amount of the inorganic filler is less than 3% by mass, effect of blending the inorganic filler may be insufficient. On the other hand, if the blending amount of the inorganic filler is more than 30% by mass and becomes too large, proportion of the shape memory resin is relatively too small. Therefore, delamination of the shaped object tends to occur, which may make the formation difficult.

In addition to the above-described materials, it is possible to add various additives to the filament resin molded article according to a coloring agent, specification, or the like. An outer diameter dimension of the filament resin molded article can also be appropriately set according to the required specification. The filament resin molded article is, for example, a filament having a diameter of about 1.75 mm.

Figure 4:
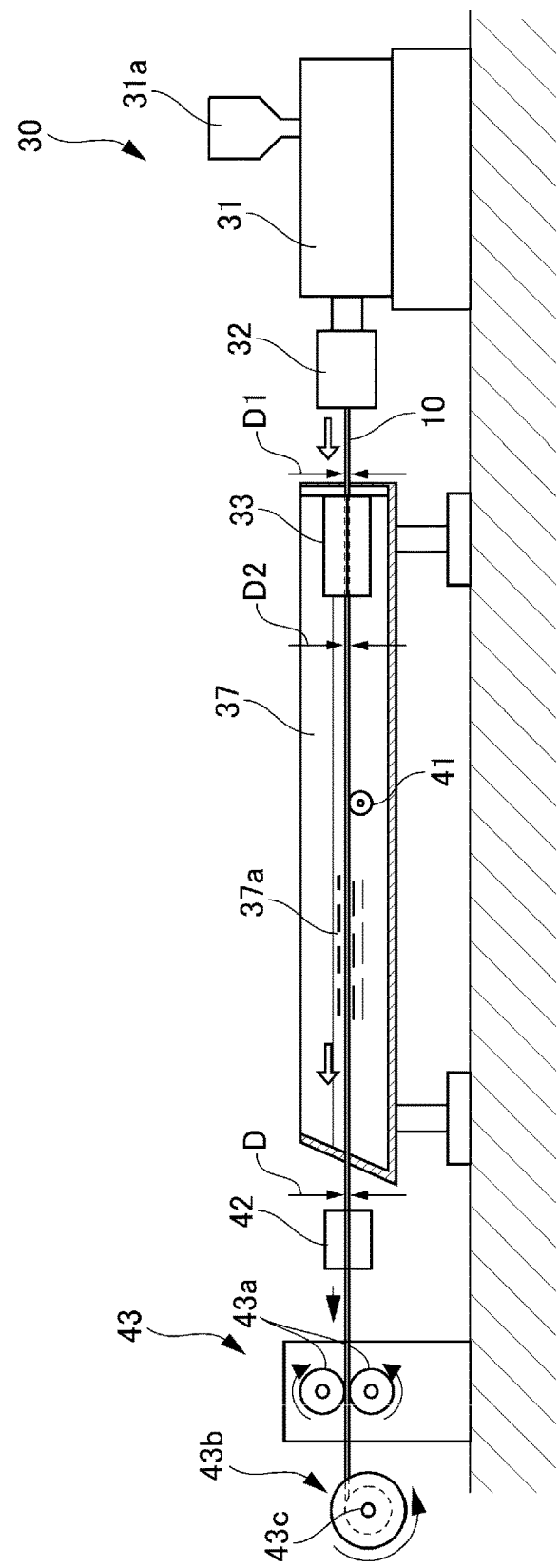
FIG. 4 is a view showing an example of a production line of the filament resin molded article.

Next, a method (production line) for producing the filament resin molded article will be described. As shown in FIG. 4, a production line 30 of the filament resin molded article 10 includes an extruder 31, a mold 32, a sizing device 33, a water tank 37, a fixing roller 41, an outer diameter dimension measuring device 42, and a winding device 43.

The extruder 31 melt-kneads a raw resin composition, and continuously supplies it to the mold 32. The extruder 31 is configured to include, for example, a cylinder incorporating a screw therein, a hopper for feeding the raw material, an injection nozzle, and the like. The raw resin composition fed from the hopper for feeding the raw material is melt-kneaded by a screw in a cylinder and injected from the injection nozzle to the mold 32.

The mold 32 extrudes the molten resin from the extruder 31 in a horizontal direction. The molten resin extruded therefrom is cooled to form the filament resin molded article 10. The raw resin composition is a blend of the above-mentioned thermoplastic resin, inorganic filler, and α-olefin elastomer.

The water tank 37 is formed in a long box shape in a conveying direction of the filament resin molded article 10 extruded from the extruder 31. The filament resin molded article 10 is introduced into the water tank 37 from a wall at one end of the water tank 37 and is led out from a wall at the other end of the water tank 37. In the water tank 37, the filament resin molded article 10 is immersed, and water 37a for cooling the filament resin molded article 10 is stored.

The sizing device 33 is disposed inside the wall of one end of the water tank 37. The sizing device 33 has a function of making a cross-section of the filament resin molded article 10 conveyed from the extruder 31 into the water tank 37 a true circle and making the outer diameter dimension of the filament resin molded article 10 uniform to a predetermined dimension.

The fixing roller 41 stabilizes posture of the filament resin molded article 10 which has passed through the sizing device 33 in the water tank 37 and conveys the filament resin molded article 10 toward the winding device 43 side.

The outer diameter dimension measuring device 42 measures the outer diameter dimension of the filament resin molded article 10 cooled in the water tank 37. The winding device 43 includes a pair of upper and lower winding rollers 43a and a bobbin winder 43b having a winding shaft 43c. The pair of upper and lower winding rollers 43a sandwiches the filament resin molded article 10 which has passed through the outer diameter dimension measuring device 42 and conveys it downstream. The winding shaft 43c is disposed downstream of the winding rollers 43a, to wind the filament resin molded article 10.

The method for producing the filament resin molded article 10 includes an extrusion step, a sizing step, a cooling step, a dimension measurement step, and a winding step. In the extrusion process, resin pellets introduced from a hopper 31a are melted in the extruder 31. The molten resin is extruded from the mold 32. The outer diameter of the extruded filament resin molded article 10 is D1.

In the sizing step, the filament resin molded article 10 is formed to have a uniform outer diameter D2 matched to an inner diameter of a conveying path by traveling along the conveying path. In the cooling step, the filament resin molded article 10 is cooled by passing through the water tank 37, and the outer diameter of the filament resin molded article 10 is reduced.

In the dimension measurement step, the outer diameter of the filament resin molded article 10 is measured, and it is determined whether a measured value has an appropriate size. When the outer diameter of the filament resin molded article 10 is outside specification, production conditions are reviewed so that the outer diameter is within the specification. In the winding step, when the outer diameter of the filament resin molded article 10 is within the specification, the filament resin molded article 10 is conveyed to the bobbin winder 43b by the winding rollers 43a of the winding device 43, so that a continuous body of the filament resin molded article 10 is wound on the winding shaft 43c. After the filament resin molded article 10 having a predetermined length is wound around the winding shaft 43c, the filament resin molded article 10 is wound around a new winding shaft 43c.

As described above, by blending the inorganic filler having a good thermal conductivity into the shape memory polymer, the thermal conductivity is improved and the heat dissipation is improved. Thus, the shape does not collapse even if the forming speed is improved, and shrinkage rate can also be reduced. Therefore, the formability can also be improved.

In addition, by filling the inorganic filler, it is possible to provide the shaped object with a high rigidity, and to provide the filament resin molded article having shape memory properties capable of further improving restoring force. For example, with a typical filament using the shape memory polymer, when forming the 3D model by the 3D printer, the formation has been difficult depending on the shape of the model. On the other hand, in the filament having the glass fiber or the carbon fiber blended therein, the formability is improved, and the formation can be performed without any problem.

Furthermore, typical shape memory polymers have low stiffness and limited useable applications. However, by using the filament blended with the glass fiber or the carbon fiber, strength can be increased and a high restoring force can be given, so that functionality can be greatly improved. Therefore, by blending the inorganic filler into the shape memory polymer, it is possible to produce the filament resin molded article having various functionalities added thereto, thereby enabling performing more functional modeling.

The embodiment to which the present invention is applied has been described above. It goes without saying that the present invention is not limited to the embodiment described above. Various modifications can be made without departing from the spirit and scope of the present invention.

EXAMPLES

Production of Filament Resin Molded Article

Example 1

A raw material composition was obtained by blending 10% by mass of glass fiber in a polyurethane-based shape memory polymer (produced by SMP Technologies Inc., trade name MM-5520). After melt-kneading this in the extruder, it was supplied to a die core, and was pulled out from a nozzle provided in the die core. The filament resin molded article was shaped by adjusting a wire diameter and a wire shape to some extent with the nozzle. Thereafter, a sizing portion was provided at an inlet of the water tank for cooling and solidification. A final cross-sectional shape (wire diameter and wire shape) of the filament resin molded article was adjusted in the sizing portion. After the filament resin molded article was shaped in the sizing portion, it was cooled and solidified in the water tank, and wound by the winder. Further, the filament resin molded article delivered from the winder was wound on a bobbin.

Comparative Example 1

The filament resin molded article was produced in the same manner as in Example 1 except that only the polyurethane-based shape memory polymer (produced by SMP Technologies Inc., trade name MM-5520) was used as the raw material.

Reference Example

A commercially available polylactic acid filament was obtained and used as the filament resin molded article.
(Confirmation of Effects)

Using the produced filament resin molded article, the 3D model was formed by the 3D printer (manufactured by BONSAI LAB, Inc., trade name BS-01), and the formability was evaluated. Further, the strength and restoring force of the shaped object were evaluated by measuring the rigidity in a tensile test. Note that the formation was performed at 215□ regarding conditions at the time of forming the shaped object.

When forming the 3D model of a predetermined shape (triangular pyramid of width 40 mm, depth 40 mm, and height 100 mm), the formability of the 3D model was evaluated by using as a formation index a numerical value obtained by dividing a height when the formability was not satisfactorily obtained by an overall height.

About the strength of the shaped object, the shaped object of length 75 mm×width 10 mm×thickness 1 mm was formed by the 3D printer. The tensile test was performed using a universal testing machine (manufactured by Shimadzu Corporation, trade name AGS-X 10 kN). The strength of the restoring force of the shaped object of length 75 mm×width 10 mm×thickness 1 mm, which was formed by the 3D printer, was measured by the following procedure using a universal testing machine with a constant temperature bath (universal testing machine: trade name AGS-X 10 kN manufactured by Shimadzu Corporation, constant temperature bath: trade name TCRIA-200P manufactured by Shimadzu Corporation). That is, first, the shaped object was held at a distance of 50 mm between chucks under an atmosphere of 75° C. in the constant temperature bath. Thereafter, a crosshead was moved to pull the shaped object by 5 mm. Thereafter, the temperature in the constant temperature bath was set to 35° C., and then the crosshead was lowered until a load became zero. When the temperature in the constant temperature bath was raised again to 75° C., a force applied to the universal testing machine was measured as the restoring force.

Figure 5:
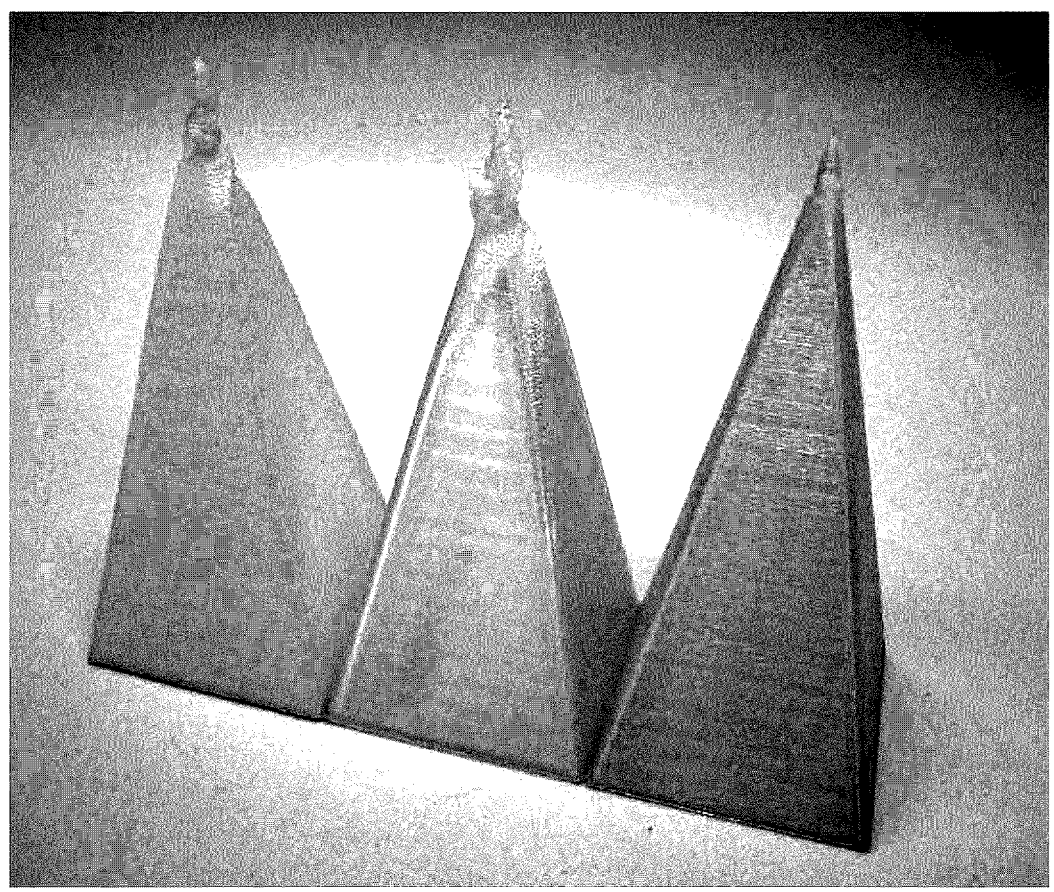
FIG. 5 is a photograph of 3D models formed in an example and a comparative example.
Figure 6:
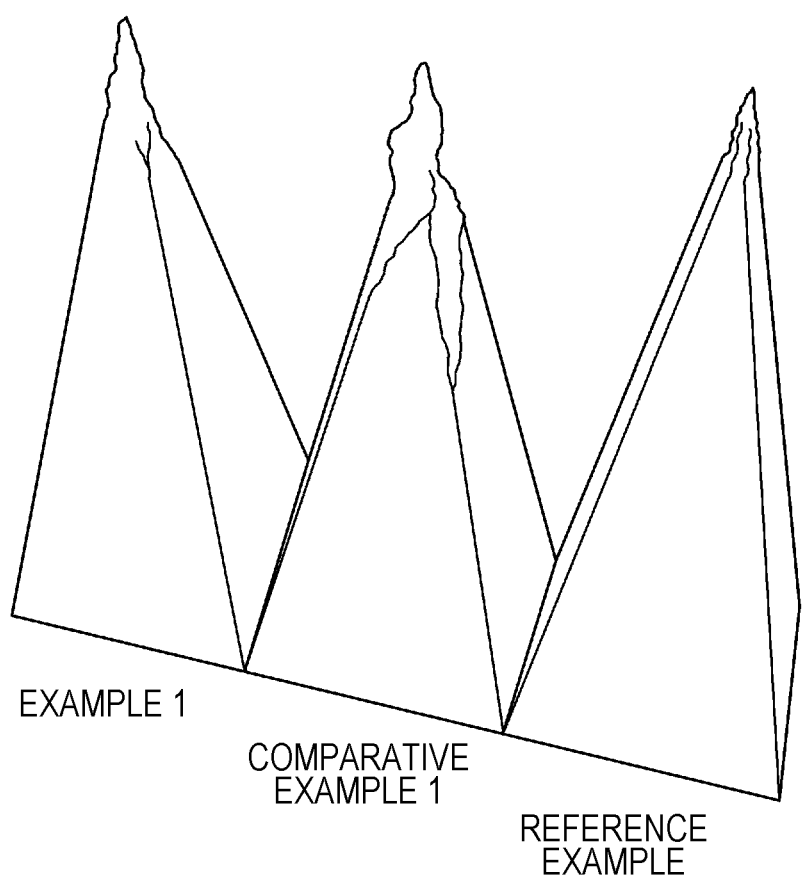
FIG. 6 shows the 3D models of FIG. 5 drawn in a figure.

Evaluation results and measurement results are shown in Table 1. In addition, a photograph of the shaped 3D models of the triangular pyramid is shown in FIG. 5. The 3D models drawn in a figure is shown in FIG. 6. In FIGS. 5 and 6, the left is the 3D model shaped using the filament resin molded article of Example 1, the center is the 3D model shaped using the filament resin molded article of Comparative Example 1, and the right is the 3D model shaped using the filament resin molded article of Reference Example.

TABLE 1

|  | Formation index (%) | Restoring force (N) | Tensile modulus (MPa) | Glass transition temperature Tg (° C.) |
|---|---|---|---|---|
| Example 1 | 80% | 1.1 | 1966 | 55 |
| Comparative Example 1 | 40% | 0.6 | 1745 | 55 |
| Reference Example | 90% | — | — | 64 |

In Example 1, addition of the glass fiber improved the formability of the 3D model, and high strength and restoring force were obtained. In contrast, in Comparative Example 1, the formability of the 3D model was not preferable, and the strength and restoring force of the shaped object were also lower than that in Example 1. Specifically, in an upper portion of the triangular pyramid, time until a next filament resin molded article is deposited on the molded filament resin molded article is short, and the next filament resin molded article is deposited at high temperature before it is sufficiently cooled, and thus its shape collapsed. In Reference Example, the formability of the 3D model is preferable. However, the strength of the shaped object was low and no restoring force was obtained.

Example 2 to Example 7

The filament resin molded articles (Example 2 to Example 7) were produced in the same manner as in Example 1 except that the blending amount of the glass fiber were respectively 1% by mass, 3% by mass, 5% by mass, 15% by mass, 30% by mass, and 40% by mass. In the filament resin molded articles of Examples 3 to 6 in which the blending amount of the glass fiber were 3% by mass to 30% by mass, the formability was good and the shape did not collapse in the formation as in Example 1. In the filament resin molded article of Example 2 in which the blending amount of the glass fiber is small (1% by mass), a slight collapse of the shape was recognized. However, degree of shape collapse was smaller than that of Comparative Example 1. In the filament resin molded article of Example 7 in which the blending amount of the glass fiber is large (40% by mass), the formability was excellent. However, delamination occurred in the shaped object.

As apparent from the above evaluation results, by adopting a configuration in which the inorganic filler is blended in the shape memory polymer, it is possible to produce the shape memory filament resin molded article capable of forming the shaped object which is excellent in formability of the 3D model and which has high strength and strong restoring force. By using this, for example, as the raw material of the three-dimensional object, it is possible to achieve modeling with higher functionality.

LIST OF REFERENCE NUMERALS

1 Drive mechanism
2 Shaping head
4 Cartridge
5 Base
10 Filament resin molded article
30 Production line
31 Extruder
32 Mold
33 Sizing device
37 Water tank
42 Outer diameter dimension measuring device
43 Winding device.

The invention claimed is:

1. A filament resin molded article for use in a hot melt lamination 3D printer, consisting of a shape memory resin and an inorganic filler,
    wherein the shape memory resin is a urethane-based shape memory polymer,
    a content of the shape memory resin is 70% by mass to 97% by mass,
    a content of the inorganic filler is 3% by mass to 30% by mass, and
    the inorganic filler is one selected from a group consisting of a glass fiber and a carbon fiber.

* * * * *